United States Patent
Vetter et al.

(10) Patent No.: US 12,081,949 B2
(45) Date of Patent: Sep. 3, 2024

(54) SYSTEMS AND METHODS FOR LOUDSPEAKER LAYOUT MAPPING

(71) Applicant: SYNG, Inc., Marina del Ray, CA (US)

(72) Inventors: Lasse Vetter, Venice, CA (US);
Matthias Kronlachner, Venice, CA (US); Ryan Mihelich, Venice, CA (US);
Christos Kyriakakis, Venice, CA (US)

(73) Assignee: SYNG, Inc., Marina del Ray, CA (US)

( * ) Notice: Subject to any disclaimer, the term of this patent is extended or adjusted under 35 U.S.C. 154(b) by 0 days.

(21) Appl. No.: 18/048,768

(22) Filed: Oct. 21, 2022

(65) Prior Publication Data
US 2023/0370796 A1    Nov. 16, 2023

Related U.S. Application Data

(60) Provisional application No. 63/270,498, filed on Oct. 21, 2021.

(51) Int. Cl.
*H04R 29/00* (2006.01)
*G01S 3/808* (2006.01)
*H04R 1/40* (2006.01)

(52) U.S. Cl.
CPC .......... *H04R 29/002* (2013.01); *H04R 1/403* (2013.01); *H04R 29/005* (2013.01); *G01S 3/8083* (2013.01); *H04R 2430/21* (2013.01)

(58) Field of Classification Search
None
See application file for complete search history.

(56) References Cited

U.S. PATENT DOCUMENTS

2019/0110153 A1* 4/2019 Pearson .................. H04S 7/305

FOREIGN PATENT DOCUMENTS

WO    WO-2018210429 A1 * 11/2018

OTHER PUBLICATIONS

International Search Report and Written Opinion for International Application No. PCT/US2022/078546, Search completed Apr. 4, 2023, Mailed Apr. 18, 2023, 11 Pgs.

* cited by examiner

*Primary Examiner* — Kenny H Truong
(74) *Attorney, Agent, or Firm* — KPPB LLP

(57) ABSTRACT

Systems and methods for loudspeaker layout mapping in accordance with embodiments of the invention are illustrated. In many embodiments, loudspeakers are able to generate tones which are used by other loudspeakers to generate impulse responses. The impulse responses and the angles at which the tones were received can be used to determine the relative locations and orientations of the loudspeakers. In various embodiments, obstacles which obstruct the path of the tone can be identified and accounted for.

23 Claims, 12 Drawing Sheets

SYSTEMS AND METHODS FOR LOUDSPEAKER LAYOUT MAPPING

CROSS-REFERENCE TO RELATED APPLICATIONS

The current application claims the benefit of and priority under 35 U.S.C. § 119(e) to U.S. Provisional Patent Application No. 63/270,498, entitled "Systems and Methods for Loudspeaker Layout Mapping" filed Oct. 21, 2021. The disclosure of U.S. Provisional Patent Application No. 63/270,498 is hereby incorporated by reference in its entirety for all purposes.

FIELD OF THE INVENTION

The present invention generally relates to audio systems, and more specifically to automatically determining the physical locations and orientations of loudspeakers within an audio system using audio signals.

BACKGROUND

Loudspeakers (commonly referred to as "speakers") are devices which convert audio signals into a corresponding sound. They are ubiquitous and used for many different applications. Audio systems can include one or more loudspeakers. Surround sound is a technique for enhancing the listening experience of sound by using multiple audio channels from multiple loudspeakers which surround the listener. There are many surround sound conventions typically referred to at least by a numeric code referring to the number and type of speakers. E.g. 5.1 surround sound uses 5 loudspeakers+1 subwoofer. Surround sound conventions have different loudspeaker layouts required for optimal performance.

SUMMARY OF THE INVENTION

Systems and methods for loudspeaker layout mapping in accordance with embodiments of the invention are illustrated. One embodiment includes a loudspeaker capable of determining its location relative to other loudspeakers, including a plurality of microphones, a plurality of drivers, a processing circuitry, and a memory, the memory containing a layout mapping application which directs the processing circuitry to: receive a stimulus tone from each other loudspeaker in a plurality of loudspeakers using the plurality of microphones, determine an angle at which each stimulus tone was received, generate an impulse response for each received stimulus tone using each said received stimulus tone, each generated impulse response associated with the other loudspeaker from the plurality of loudspeakers which generated the received stimulus tone, transmit the stimulus tone using the plurality of drivers, receive, from each other loudspeaker in the plurality of other loudspeakers, a plurality of impulse responses, and a plurality of angles from stimulus tones were received by the other loudspeaker, generate a distance matrix using the generated impulse responses and the received pluralities of impulse responses, generate an angle of arrival (AOA) matrix using the determined angles and the received pluralities of angles, and determine a location for each other loudspeaker in the plurality of other loudspeakers in a coordinate system.

In another embodiment, each value in the distance matrix is an estimated distance between two loudspeakers based on time-of-flight calculations using impulse responses associated with stimulus tones produced by a first of the two loudspeakers received by a second of the two loudspeakers, and impulse responses produced by the second of the two loudspeakers received by the first of the two loudspeakers.

In a further embodiment, each value in the AOA matrix is the angle from which a respective stimulus tone produced by a first loudspeaker was recorded by a second loudspeaker from a perceived orientation of the second loudspeaker.

In still another embodiment, to determine the location of each other loudspeaker in the plurality of other loudspeakers, the layout mapping application further directs the processing circuitry to: define the coordinate system using the loudspeaker and a second loudspeaker from the plurality of other loudspeakers, where the loudspeaker is at an origin of the coordinate system, and the second loudspeaker is placed at a distance and angle from the origin based on the distance matrix and the AOA matrix, and place the remainder of the other loudspeakers in the plurality of loudspeakers in the coordinate system based on the measured distance and angle from the loudspeaker based on the distance matrix and the AOA matrix, adjusted to match the defined coordinate system.

In a still further embodiment, the layout mapping application further directs the processing circuitry to incrementally adjust the position of each loudspeaker in the coordinate system until average error between distance values in the distance matrix and distances between loudspeakers in the coordinate system is minimized.

In yet another embodiment, the layout mapping application further directs the processor to identify a lack of line-of-sight between at least two loudspeakers in the coordinate system, and adjust the location of each given loudspeaker of the two loudspeakers using distance measurements in the distance matrix and angle measurements in the AOA matrix based on measurements from loudspeakers with line-of-sight to the given loudspeaker.

In a yet further embodiment, the layout mapping application further directs the processor to determine an orientation for each other loudspeaker in the plurality of other loudspeakers.

In another additional embodiment, to determine the orientation for each other loudspeaker in the plurality of other loudspeakers, the layout mapping application further directs the processing circuitry to: calculate, for each given other loudspeaker in the plurality of other loudspeakers, an angle at which the given other loudspeaker should have heard each of the remainder of other loudspeakers and the loudspeaker, in the frame of reference of the loudspeaker, based on the determined locations, calculate the difference between the calculated angles and associated angles in the AOA matrix, assigning the rotation for each other loudspeaker in the plurality of other loudspeakers as the calculated difference.

In a further additional embodiment, the layout mapping application further directs the processing circuitry to determine a usable listening area based on the placements and orientations of the other loudspeakers in the plurality of other loudspeakers.

In another embodiment again, to determine a usable listening area, the layout mapping application further directs the processing circuitry to: identify an obstacle blocking line of sight between two loudspeakers, and a third loudspeaker having line of sight to both of the two loudspeakers, calculate the linear distance between the two loudspeakers, b, as a longest side of a triangle, define a measured distance, m, from the distance matrix, as the sum of a first and a second side of the triangle: a and c, respectively, define angles of the triangle using vectors describing a computed theoretical path between the two loudspeakers and the third loudspeaker, and a vector pointing from each of the two loudspeakers to an edge of the obstacle, calculate the values of a and c by modifying the values of a and c until a+c=m, while maintaining the triangle as valid, and define the usable listening area as containing the shape having sides a, c, the line segment formed between a first of the two loudspeakers and the third loudspeaker, and the line segment formed between a second of the two loudspeakers and the third loudspeaker.

In a further embodiment again, a method for automatically determining the relative positions of loudspeakers in an audio system includes: for each given loudspeaker in a plurality of loudspeakers: generating a stimulus tone using the given loudspeaker, recording the stimulus tone at all loudspeakers in the plurality of loudspeakers but the given loudspeaker, and recording the angle from which the stimulus tone was received by all loudspeakers in the plurality of loudspeakers but the given loudspeaker, generating an impulse response for each recorded stimulus tone, generating a distance matrix and an angle of arrival (AOA) matrix based on the impulse responses, where each value in the distance matrix is an estimated distance between two loudspeakers in the plurality of loudspeakers based on time-of-flight calculations using the impulse responses, and where each value in the AOA matrix is the angle from which a respective stimulus tone was recorded, defining a coordinate having a first loudspeaker from the plurality of loudspeakers at the origin, and a second loudspeaker from the plurality of loudspeakers on a first axis of the coordinate at an estimated distance between the first loudspeaker and the second loudspeaker from the distance matrix, and placing remaining loudspeakers from the plurality of loudspeakers in the coordinate at distances and angles from already placed loudspeakers in the coordinate using values from the distance matrix and AOA matrix.

In still yet another embodiment, the method further includes identifying the presence of an obstacle based on inconsistent distances in the distance matrix, and correcting the distances in the distance matrix using measurements from at least three loudspeakers.

In a still yet further embodiment, the method further includes assigning an orientation to each loudspeaker in the coordinate system.

In still another additional embodiment, assigning an orientation to each loudspeaker in the coordinate system includes: calculating an angle at which each loudspeaker should have heard each of the remainder of loudspeakers based on the determined locations, calculating the difference between the calculated angles and associated angles in the AOA matrix, and assigning the rotation for each loudspeaker as the calculated difference.

In a still further additional embodiment, the method further includes determining a usable listening area based on the placements and orientations of the loudspeakers.

In still another embodiment again, determining a usable listening area includes: identifying an obstacle blocking line of sight between two loudspeakers, and a third loudspeaker having line of sight to both of the two loudspeakers, calculating the linear distance between the two loudspeakers, b, as a longest side of a triangle, defining a measured distance, m, from the distance matrix, as the sum of a first and a second side of the triangle: a and c, respectively, defining angles of the triangle using vectors describing a computed theoretical path between the two loudspeakers and the third loudspeaker, and a vector pointing from each of the two loudspeakers to an edge of the obstacle, calculating the values of a and c by modifying the values of a and c until a+c=m, while maintaining the triangle as valid, and defining the usable listening area as containing the shape having sides a, c, the line segment formed between a first of the two loudspeakers and the third loudspeaker, and the line segment formed between a second of the two loudspeakers and the third loudspeaker.

In a still further embodiment again, a self-mapping audio system includes: a plurality of loudspeakers, a processor, communicatively coupled to the plurality of loudspeakers, and a memory communicatively coupled to the processor, the memory containing a layout mapping application that directs the processor to: sequentially generate a stimulus tone using each given loudspeaker in the plurality of loudspeakers, record the stimulus tone at all loudspeakers in the plurality of loudspeakers but the given loudspeaker, and record the angle from which the stimulus tone was received by all loudspeakers in the plurality of loudspeakers but the given loudspeaker, generate an impulse response for each recorded stimulus tone, generate a distance matrix and an angle of arrival (AOA) matrix based on the impulse responses, where each value in the distance matrix is an estimated distance between two loudspeakers in the plurality of loudspeakers based on time-of-flight calculations using the impulse responses, and where each value in the AOA matrix is the angle from which a respective stimulus tone was recorded, define a coordinate having a first loudspeaker from the plurality of loudspeakers at the origin, and a second loudspeaker from the plurality of loudspeakers on a first axis of the coordinate at an estimated distance between the first loudspeaker and the second loudspeaker from the distance matrix, and place remaining loudspeakers from the plurality of loudspeakers in the coordinate at distances and angles from already placed loudspeakers in the coordinate using values from the distance matrix and AOA matrix.

In yet another additional embodiment, the layout mapping application further directs the processor to: identify the presence of an obstacle based on inconsistent distances in the distance matrix, and correct the distances in the distance matrix using measurements from at least three loudspeakers.

In a yet further additional embodiment, the layout mapping application further directs the processor to assign an orientation to each loudspeaker in the coordinate system.

In yet another embodiment again, to assign orientation to each loudspeaker in the coordinate system, the layout mapping application further directs the processor to: calculate an angle at which each loudspeaker should have heard each of the remainder of loudspeakers based on the determined locations, calculate the difference between the calculated angles and associated angles in the AOA matrix, and assign the rotation for each loudspeaker as the calculated difference.

In a yet further embodiment again, the layout mapping application further directs the processor to determine a usable listening area based on the placements and orientations of the loudspeakers.

In another additional embodiment again, to determine a usable listening area, the layout mapping application further directs the processor to: identify an obstacle blocking line of sight between two loudspeakers, and a third loudspeaker having line of sight to both of the two loudspeakers, calculate the linear distance between the two loudspeakers, b, as a longest side of a triangle, define a measured distance, m, from the distance matrix, as the sum of a first and a second side of the triangle: a and c, respectively, define angles of the triangle using vectors describing a computed theoretical path between the two loudspeakers and the third loudspeaker, and a vector pointing from each of the two loudspeakers to an edge of the obstacle, calculate the values of a and c by modifying the values of a and c until a+c=m, while maintaining the triangle as valid, and define the usable listening area as containing the shape having sides a, c, the line segment formed between a first of the two loudspeakers and the third loudspeaker, and the line segment formed between a second of the two loudspeakers and the third loudspeaker.

In a further additional embodiment again, the processor and the memory are incorporated into one of the loudspeakers in the plurality of loudspeakers.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

When setting up a conventional surround sound system, it is critical for loudspeakers to be placed in proper positions so that they closely match the position of the loudspeakers in the content creation environment. While, depending on the system, some amount of off-specification placement will not greatly impair the listening experience, when striving for the optimal (or avoiding the unlistenable), placement matters. Unfortunately, users often cannot, are unwilling to, or are unaware of how to place their loudspeakers in the correct positions. However, if the loudspeakers were aware of their relative positions and orientations, depending on their hardware they may be able to lessen the effects of poor placement through audio signal processing.

The ability to lessen the effects of poor placement increases significantly when one or more of the loudspeakers are capable of controlling the direction of sounds they reproduce to create a 360-degree spatial audio listening environment. For example, the Syng Cell Alpha by Syng, Inc. of Venice, California is capable of producing such a 360-degree spatial audio listening environment. Systems and methods described herein can utilize loudspeakers with the ability to produce directional sound as well as record sound using a microphone array to identify the direction of incoming sound in order to calculate the relative positions of loudspeakers in the system. In many embodiments, errors introduced by obstacles interfering with line-of-sight between different loudspeakers can be mitigated. In various embodiments, loudspeakers can detect nearby obstacles such as (but not limited to) walls. Self-mapping audio systems and constituent loudspeakers are discussed in further detail below.

Self-Mapping Audio Systems

Self-mapping audio systems are capable of determining the position and orientation of loudspeakers within the system. In many embodiments, loudspeakers within self-mapping audio systems are "cells" such as those described in U.S. patent application Ser. No. 16/839,021, published as U.S. Patent Publication 2020/0367009, titled "Systems and Methods for Spatial Audio Rendering", which is incorporated by reference in its entirety. Loudspeakers within self-mapping audio systems can directionally generate audio, and record audio using on-board microphones arranged in such a way that the direction of incoming sound can be determined. Loudspeakers as discussed herein can further transmit and receive data to and from other loudspeakers and/or other computing devices. In numerous embodiments, a "primary" loudspeaker can carry out layout mapping processes using data acquired from other loudspeakers in the system. While the below is discussed with the assumption that a loudspeaker is carrying out necessary computations, as can be readily appreciated, any number of connected computing devices can be used to carry out the computations without departing from the scope or spirit of the invention.

Figure 1:
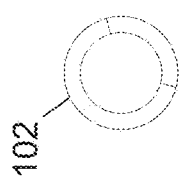
FIG. 1 illustrates an example self-mapping audio system in accordance with an embodiment of the invention.
Figure 1:
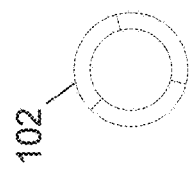
Figure 1:
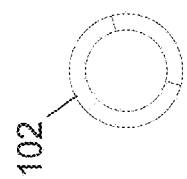

Turning now to FIG. 1, an example self-mapping audio system in accordance with an embodiment of the invention is illustrated. Self-mapping audio system 100 includes three loudspeakers 102. While only three are illustrated in FIG. 1, as can be readily appreciated, any arbitrary number of loudspeakers can be included in self-mapping audio systems. While many self-mapping audio systems include only loudspeakers that can provide and collect sufficient data to enable mapping their particular placement, self-mapping audio systems can include one or more loudspeakers that do not have microphones and/or horn/driver arrangements that enable complete data collection without departing from the scope or spirit of the invention. For example, in numerous embodiments, speakers without microphones can still produce impulses and other loudspeakers in the system can use their microphones to record. Additionally, not all loudspeakers in a self-mapping audio system are required to be capable of being mapped. Conventional speaker can be included without disrupting audio, although overall quality may be impaired depending on the type of loudspeaker and/or placement of said loudspeaker. By way of further example, self-mapping audio systems may also include independent subwoofers which may or may not be able to be mapped. In many embodiments, subwoofers can include one or more microphones capable of recording impulse responses.

Figure 2:
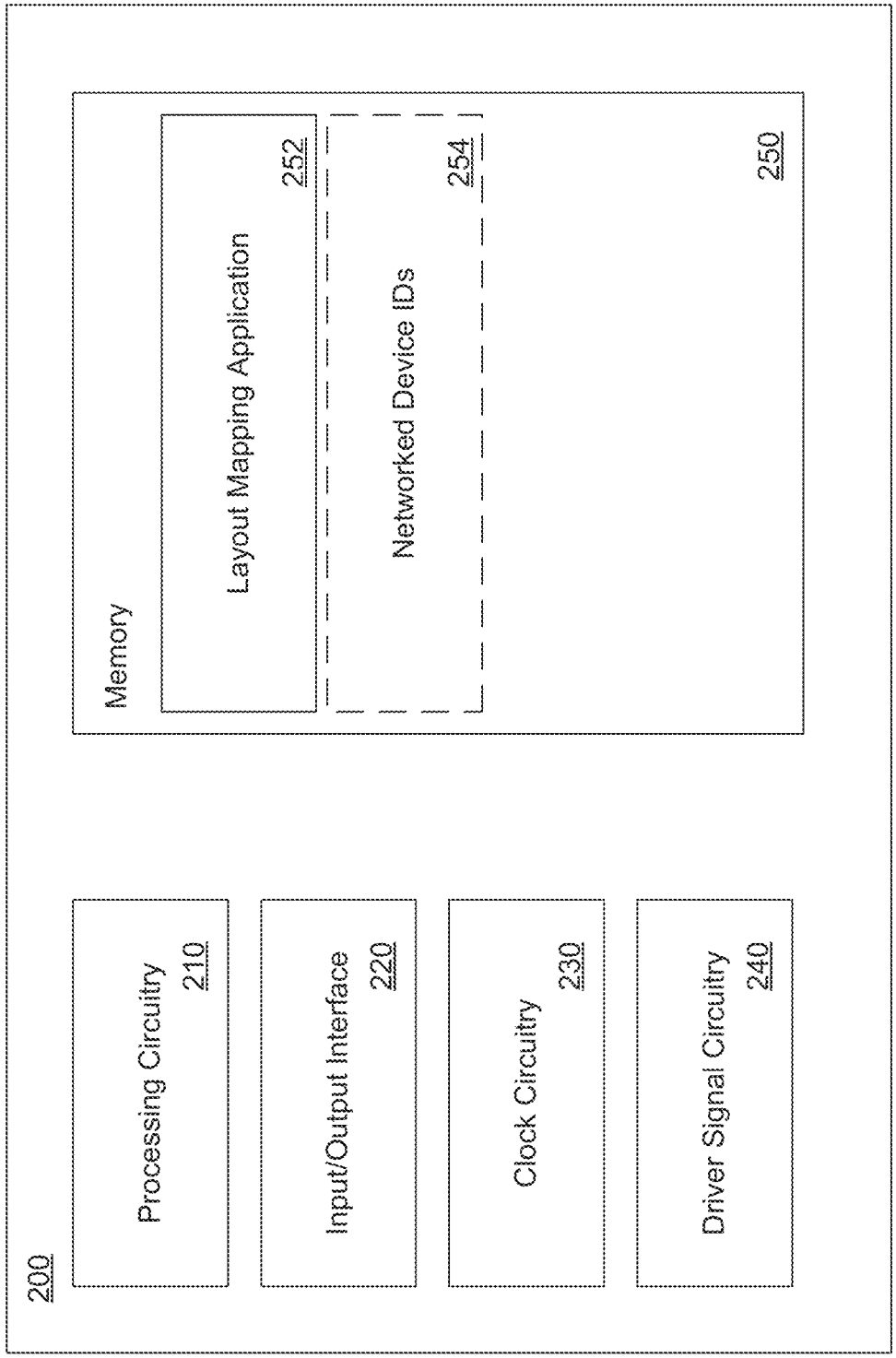
FIG. 2 is a block diagram for a loudspeaker in accordance with an embodiment of the invention.

Turning now to FIG. 2, a block diagram for a loudspeaker in accordance with an embodiment of the invention is illustrated. Loudspeaker 200 includes a processing circuitry 210. Processing circuitry can include any number of different logic processing circuits such as, but not limited to, processors, microprocessors, microcontrollers, central processing units, parallel processing units, graphics processing units, application specific integrated circuits, field-programmable gate-arrays, and/or any other processing circuitry or combinations thereof capable of performing spatial audio processes as appropriate to the requirements of specific applications in accordance with various embodiments of the invention.

Loudspeaker 200 can further include an input/output (I/O) interface 3220. In many embodiments, the I/O interface includes a variety of different ports and can communicate using a variety of different methodologies. In numerous embodiments, the I/O interface includes a wireless networking device capable of establishing an ad hoc network and/or connecting to other wireless networking access points. In a variety of embodiments, the I/O interface has physical ports for establishing wired connections. However, I/O interfaces can include any number of different types of technologies capable of transferring data between devices. In numerous embodiments, the I/O interface is capable of receiving data from microphones embedded in the loudspeaker. Loudspeaker 200 further includes clock circuitry 230. In many embodiments, the clock circuitry includes a quartz oscillator. In various embodiments, the clock circuitry (either alone or in combination with the processing circuitry) is sufficiently reliable to record when audio is played back via the drivers and when audio is recorded by the microphones.

Loudspeaker 200 can further include driver signal circuitry 240. Driver signal circuitry is any circuitry capable of providing an audio signal to a driver in order to make the driver produce audio. In many embodiments, the loudspeaker 200 includes many drivers, and each driver has its own portion of the driver circuitry. In numerous embodiments, the loudspeaker contains at least three coplanar drivers fitted to three coplanar horns offset by 120-degrees. In many embodiments, a microphone is fitted between each horn. In various embodiments, one microphone for each horn is fitted to a central stem, where each microphone is aligned with the centerline of the respective horn.

Loudspeaker 200 can also include a memory 250. Memory can be volatile memory, non-volatile memory, or a combination of volatile and non-volatile memory. Memory 250 can store applications including (but not limited to) a layout mapping application 252. In many embodiments, layout mapping application is capable of directing the processing circuitry to carry out various layout mapping processes. In numerous embodiments, the memory 250 further includes a list of networked device identifiers 254. The networked device identifiers can include unique identifiers for each loudspeaker in the system. In numerous embodiments, the networked device identifiers also include unique identifiers for other devices that are communicatively coupled to the loudspeaker. In many embodiments, each loudspeaker in the system is known by its unique identifier.

While a particular loudspeaker in accordance with an embodiment of the invention is illustrated in FIG. 2, any number of different types of loudspeakers can make up a self-mapping audio system as described herein. As can be readily appreciated, so long as a loudspeaker is capable of generating and transmitting data similar to that discussed below, the particular aesthetic style and design of the loudspeaker can be arbitrary as appropriate to the requirements of specific applications of embodiments of the invention. This can be understood in further depth in the context of layout mapping processes which are discussed at length below.

Layout Mapping Processes

While users may have the best of intentions, loudspeakers are often placed in suboptimal locations. Further, many homes or other locations themselves might not be optimally constructed for good loudspeaker placement. While conventional systems may attempt to modify their playback to create an optimal listening position, this is traditionally performed by having a user move a device through the space. Layout mapping processes described herein can leverage loudspeaker hardware that can both directionally produce and record sound in order to automatically determine the physical locations and orientations of loudspeakers in the space with no prior knowledge of the space. Further, objects which cause acoustic interference (walls, chairs, tables, bookshelves, and any other object which can cause a barrier to line-of-sight propagation between loudspeakers) can be identified and adjusted for. Once the locations of loudspeakers are determined, a usable listening area can be calculated. Loudspeaker placement maps can be used to adjust audio produced by the system to generate a more optimal listening experience.

Figure 3:
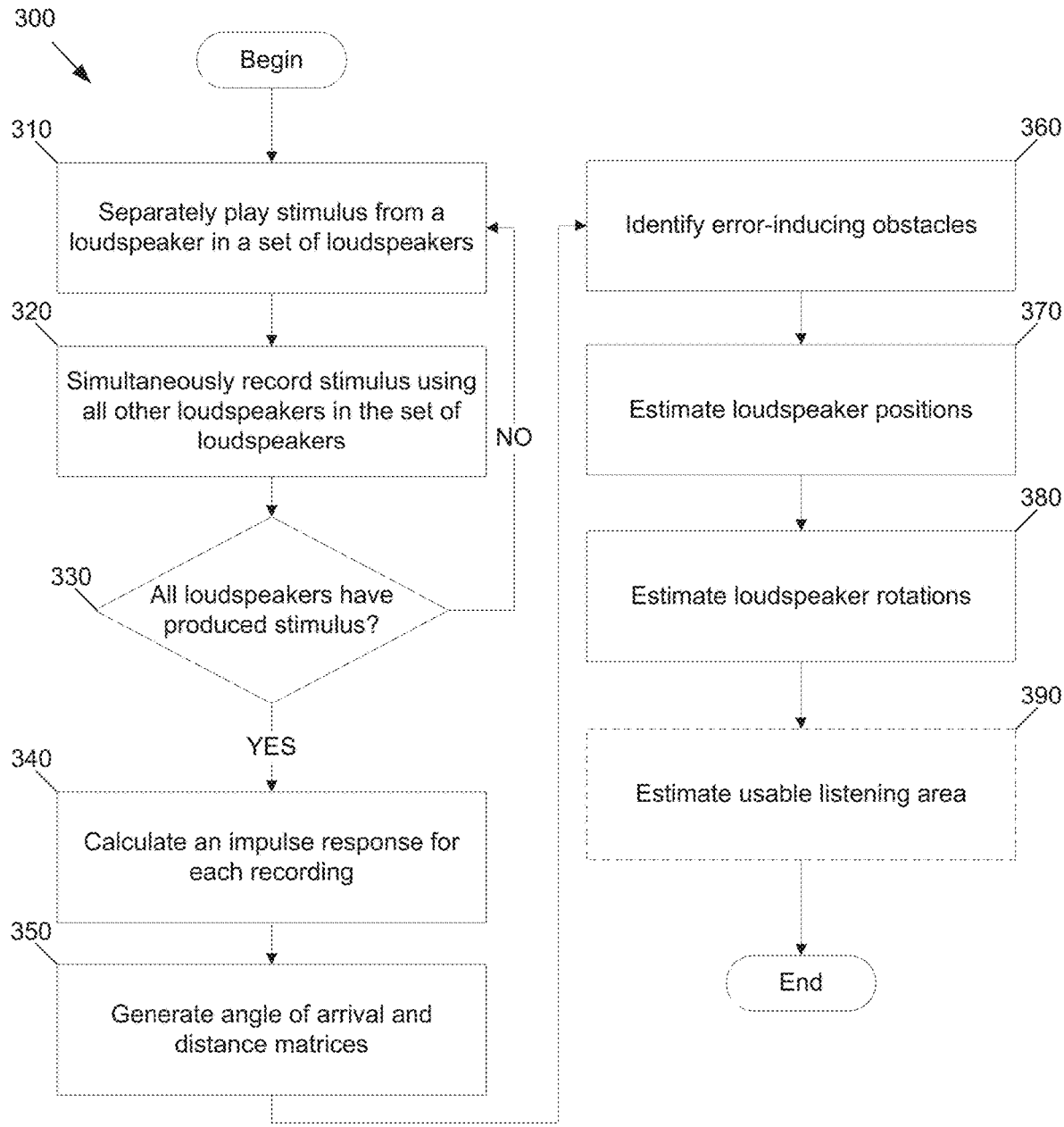
FIG. 3 is a flow chart for a layout mapping process for determining the position and orientation of loudspeakers within a space.

Turning now to FIG. 3, a flowchart for a layout mapping process in accordance with an embodiment of the invention is illustrated. Process 300 includes separately playing a stimulus tone (310) from a loudspeaker. In many embodiments, the stimulus tone is a sine sweep up or down a frequency scale. In numerous embodiments, the stimulus tone is projected equally 360-degrees around the loudspeaker. While the stimulus tone is playing, all other loudspeakers in the system listen using their respective microphones to record (320) the stimulus tone. In many embodiments, the loudspeakers share a clock with sub-sample precision of the audio rate of the stimulus tone to enable synchronous playback of the stimulus tone and recording of it on different devices. I.e. when one loudspeaker begins stimulus playback (x(n) at time n), every other loudspeaker begins recording (y(n)) at the same time. Each recording can include a record of the received tone, the time the tone was received, and the angle at which the tone was received. This process is repeated (330) until each loudspeaker has produced a stimulus tone for the remainder of the loudspeakers to record. Each recording used to generate an impulse response (340). In numerous embodiments, the impulse response h(n) is generated using:

$$h = \mathcal{F}^{-1}\left\{\frac{\mathcal{F}\{y\}}{\mathcal{F}\{x\} + \lambda(f)}\right\}$$

where $\mathcal{F}$ and $\mathcal{F}^{-1}$ represent the Fourier Transform and Inverse Fourier Transform and $\lambda$ is a regularization factor to prevent the ratio from becoming unstable. As can be readily appreciated by a person of ordinary skill in the art, there are numerous other methods to generate an impulse response by processing a recorded signal and comparing it to the original.

For N loudspeakers, two separate N×N matrices are generated (350): a distance matrix and an angle of arrival (AOA) matrix. Each row and each column represent a unique loudspeaker in the set of N loudspeakers. Each cell of the distance matrix reflects an estimated distance from a first loudspeaker to a second loudspeaker. The distance matrix can be populated using time-of-flight distance calculations based on the impulse responses. Similarly, each cell of the AOA matrix reflects an estimated angle from which a first loudspeaker heard the second loudspeaker. In many embodiments, each loudspeaker has its own locally understood orientation, and the AOA is an angle with respect to that individual loudspeaker's orientation (e.g. straight forward is 0-degrees). As such, merely looking at the AOA matrix on its own can be difficult (and in some circumstances impossible) to decipher. Using these matrices, error-inducing obstacles can be identified (360). Loudspeaker positions and loudspeaker relative orientations can be estimated (370; 380). In many embodiments, the process for determining loudspeaker positions is altered based on whether or not error-inducing obstacles were identified. Processes for identifying obstacles, estimating positions, and estimating orientations are discussed in further detail below. In many embodiments, a useable listening area is estimated (390) which can in turn be used to modify playback.

As can be readily appreciated, while a particular process is illustrated with respect to FIG. 3, certain steps may be performed out of turn and/or synchronously. Further, it is not a requirement to perform every step; e.g. it is not a requirement to detect obstacles and/or determine a useable listening area. Further, said process not need to be performed on a loudspeaker, and instead can be performed on a different computing device such as (but not limited to) a cell phone, a server, a tablet computer, a personal computer, and/or any other computing device as appropriate to the requirements of specific applications of embodiments of the invention. Further, in many embodiments, self-mapping audio systems may include a large number of loudspeakers in different spaces. In various embodiments, users can select a certain subset of loudspeakers as being in a single group. In such circumstances, the layout mapping process may occur separately for each group. Additional detail regarding steps in process 300 are discussed in further detail below.

Estimating Loudspeaker Position

Estimating loudspeaker positions can be done in a variety of different ways that can have dramatically different accuracy depending on the scenario. A more straightforward scenario (which is often the case) is that all loudspeakers have a direct line-of-sight to one another (e.g. as seen in the loudspeaker arrangement of FIG. 1). In this case, estimated time-of-flight distances along with AOA measurements can be used to directly estimate positions. In a more complex scenario, at least two of the loudspeakers do not have line-of-sight, and therefore when the stimulus tone is transmitted by a first loudspeaker, it is received by the second loudspeaker after having been impacted by an obstacle. In many cases, the obstacle is a wall, but any number of different objects can impede line-of-sight. First, the complete line-of-sight scenario will be explored, followed by the obstacle scenario. Further, the below discusses the "placement" of loudspeakers within coordinates. As can be readily appreciated, this "placement" process is not a physical placement of the loudspeaker, but rather a virtual placement in a mathematical structure.

Figure 4:
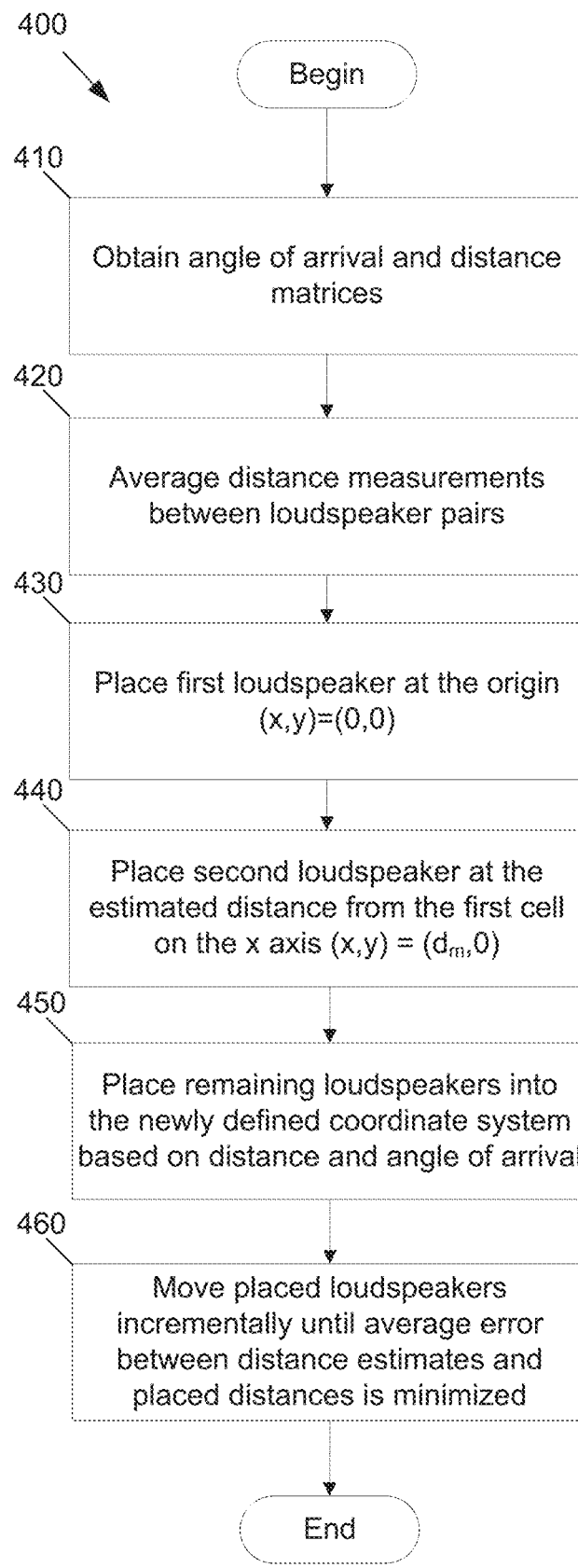
FIG. 4 is a flow chart for a layout mapping process for mitigating error-inducing obstacle scenarios in accordance with an embodiment of the invention.

Turning now to FIG. 4, a process for estimating position of loudspeakers when there is line-of-sight between all loudspeakers in accordance with an embodiment of the invention is illustrated. Process 400 includes obtaining (410) AOA and distance matrices. Each matrix contains pairs of cells that reflect the same two loudspeakers alternatingly transmitting and receiving audio. That is, a first cell in the distance matrix contains a distance measurement estimated from an impulse response generated using a tone generated by loudspeaker A, recorded by loudspeaker B. A second cell in the distance matrix in the mirrored location reflects the distance measurement estimated from an impulse response generated using a tone generated by loudspeaker B, recorded by loudspeaker A. Theoretically, these two estimated distances should be identical. However, due to small variances and noise, they may slightly differ. These two distance estimates are averaged (420) to generate a theoretically more accurate distance estimate. Formally: $d_m=(d_{ij}+d_{ji})/2$. The result is a single estimated distance between each loudspeaker in the system.

A first arbitrary loudspeaker is selected and placed (430) at the origin (x,y)=(0,0) of a coordinate system. A second arbitrary loudspeaker is placed (440) in the coordinate system at the estimated distance from the first cell on the x-axis (x,y)=($d_m$,0). In doing this, the coordinate system is now fixed, and angles of arrival can be used to determine the relative placement of each other loudspeaker. By locking two loudspeakers with known angles relative to each other to the x-axis, translation between each loudspeaker's individually oriented coordinate systems is possible. The remaining loudspeakers are then placed (450) into the newly defined coordinate system using the calculated distances and angles of arrival measured by the first arbitrary loudspeaker. For example, if the first arbitrary loudspeaker heard the second arbitrary loudspeaker at 57 degrees, which is now straight along the x-axis (0 degrees), and heard a third arbitrary loudspeaker at 147 degrees, then the third arbitrary loudspeaker can be placed on the y-axis at the estimated distance from the first arbitrary loudspeaker.

In many embodiments, placement of all loudspeaker is done with respect to the first arbitrary cell, however, it is not a requirement. Indeed, due to small errors, placements of a given loudspeaker with respect to two other loudspeakers may slightly disagree. To resolve this, placed loudspeakers are incrementally moved (460), or "wiggled" about their placement location until the average error between the distance estimates and placed distances are minimized. By performing this wiggling, all inter-loudspeaker distance estimates are leveraged. Further, in order to make the wiggling process efficient, gradients can be computed and local minima can be used as a halting function.

While a particular process for estimating placement of loudspeakers is illustrated in FIG. 4, any number of different processes can be used as appropriate to the requirements of specific applications of embodiments of the invention. For example, as can be readily appreciated, depending on the layout and loudspeaker hardware available, this coordinate system can easily be extended into three dimensions by adding an elevation angle of arrival. By way of further example, in some embodiments, it is not required to wiggle the placements in order to get a more precise mapping.

Figure 5:
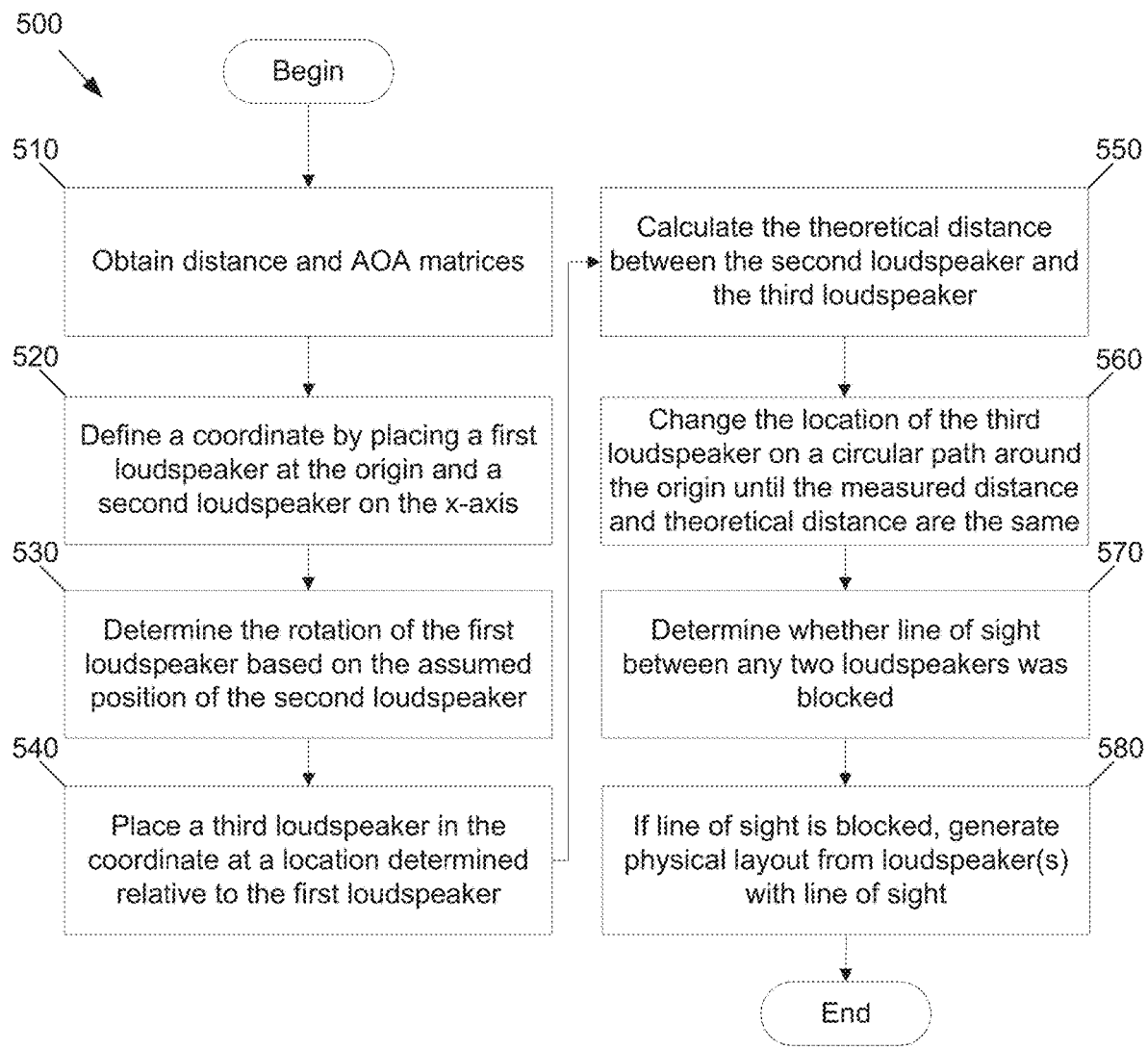
FIG. 5 is a flow chart for a layout mapping process for determining physical placement locations of loudspeakers in a space in accordance with an embodiment of the invention.

Turning now to FIG. 5, a process for estimating placement of loudspeakers in the presence of obstacles is illustrated in accordance with an embodiment of the invention. As noted above, when line-of-sight is not achieved between all loudspeakers, estimating distances becomes more complex, as the estimated distances between loudspeakers may not actually reflect the Euclidean distance between them. Therefore, calibration can be thrown off as depending on the particular layout, the above process tries to ensure that all mean estimated distances are met. Process 500 can resolve this issue when at least one loudspeaker has line-of-sight to two others. This process can be scaled beyond three loudspeakers, but the specific example illustrated in FIG. 5 will presume three to make comprehension easier.

Figure 6A:
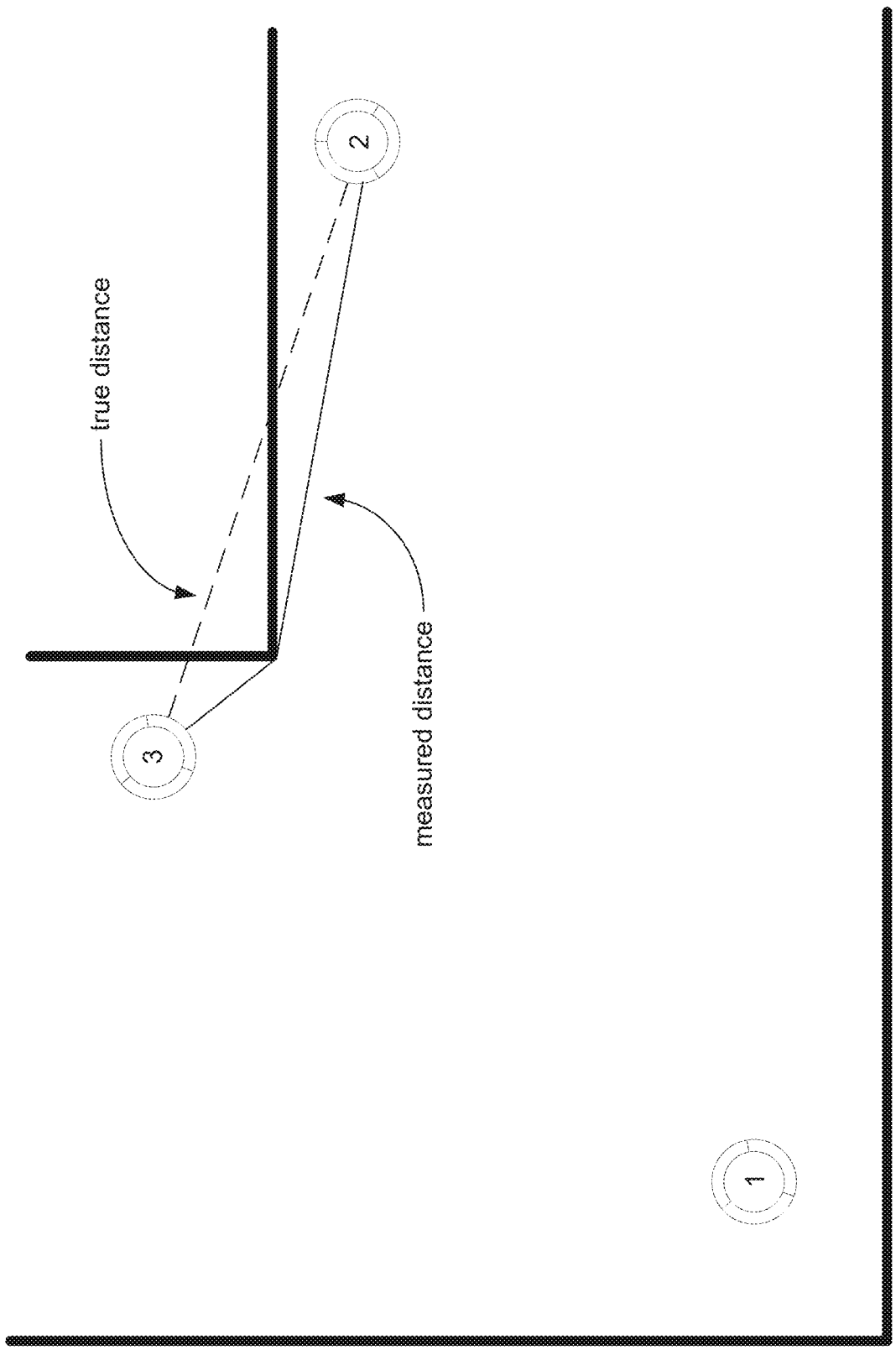
FIGS. 6A-B illustrates an example error-inducing obstacle scenario in accordance with an embodiment of the invention.
Figure 6B:
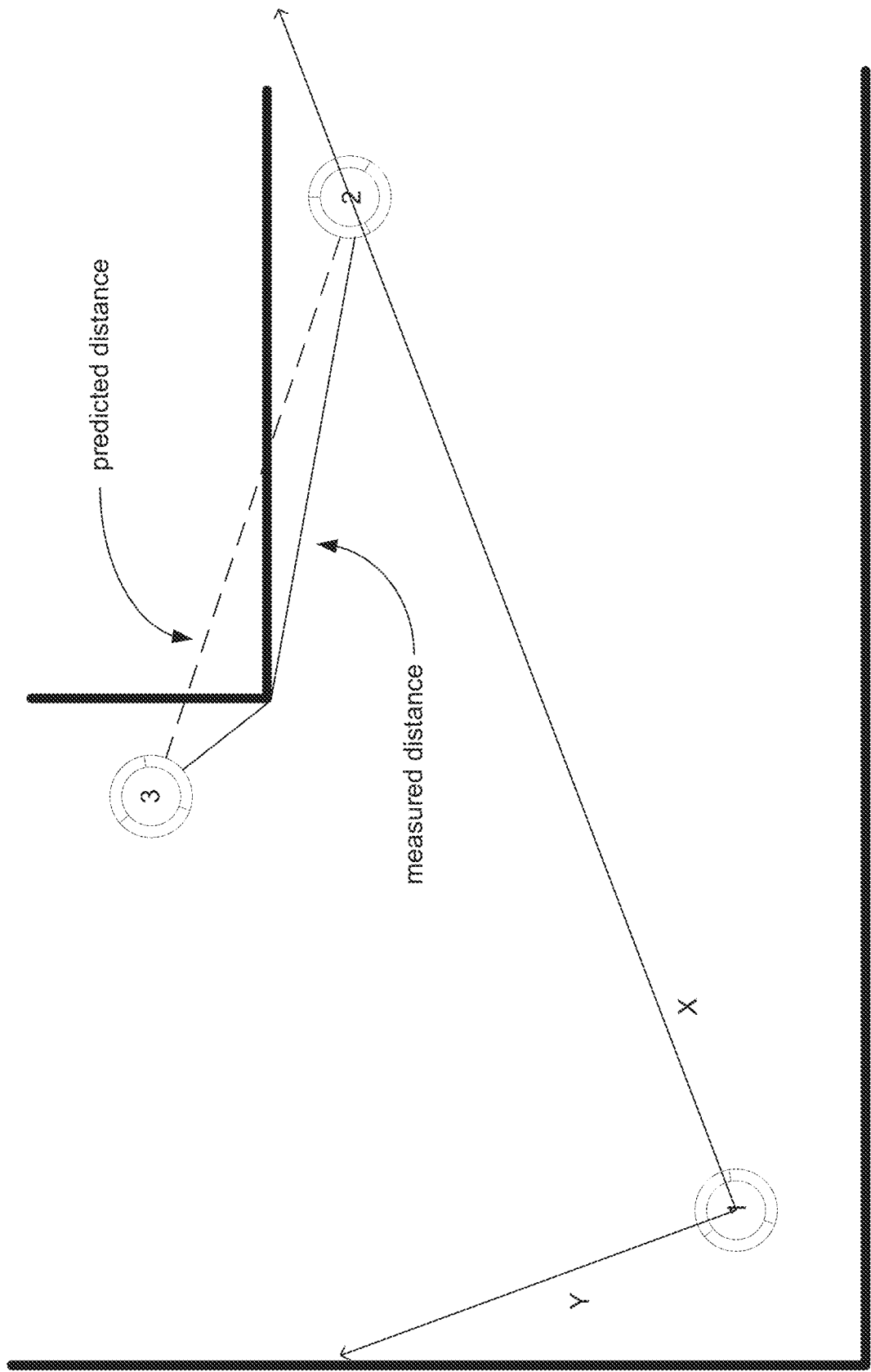

Similar to the above, after obtaining (510) the distance and AOA matrices (with the averaged estimated distances), process 500 includes defining (520) a coordinate system by placing a first arbitrary loudspeaker at the origin, and placing (530) a second arbitrary loudspeaker on the x-axis at the estimated distance apart. The rotation (540) of the first loudspeaker can then be determined to define the coordinate based on the assumed position of the second loudspeaker using the AOA matrix. A third loudspeaker is then placed in the newly defined coordinate at the estimated distance from the first loudspeaker based on the AOA measurement of the first loudspeaker, taking its own rotation into account using the AOA matrix. FIG. 6A illustrates an example of this scenario in accordance with an embodiment of the invention. Loudspeaker 1 has direct line of sight to loudspeakers 2 and 3, but loudspeakers 2 and 3 cannot "see" each other. As such, a stimulus produced by 3 will have to propagate around the L-shaped wall, throwing off the time-of-flight calculation. FIG. 6B illustrates the coordinate defined by loudspeaker 1 at the origin and loudspeaker 2 on the X-axis in accordance with an embodiment of the invention. A theoretical distance between the second loudspeaker and the third loudspeaker is then calculated (550) based on the placed distances in the coordinate. The placement of the third loudspeaker is changed (560) over a circular path about the origin until the estimated distance and the theoretical distances are equal.

A determination (570) is then made as to whether line-of-sight between any two loudspeakers was blocked. In many embodiments, this involves using the normalized difference between the theoretical and estimated distance, and the angular change from the measured to the rotated end positions as a weighted sum to determined if line of sight was indeed blocked. Formally:

$$\psi = \alpha \frac{\|p - m\|}{p} + (1 - \alpha)|\theta_{delta}|$$

where p=predicted distance; m=measured (estimated) distance; α=tuning parameter, $|\theta_{delta}|$=angular delta from above; where $$\Psi > \tau \rightarrow \text{Line of Sight Not Given}$$

where τ=tuning parameter.

This process can be repeated for every combination of three loudspeakers in order to determine which loudspeakers have line of sight. If line of sight is blocked, generate (580) the physical layout is determined using data from loudspeakers with line of sight. In numerous embodiments, placements generated during the determination of line of sight can be stitched together to generate a complete, accurate set of placements. In numerous embodiments, a process similar to one discussed above with respect to FIG. 4 is used where only values in the distance and AOA matrices taken by loudspeaker pairs with line of sight are used. In various embodiments, if no obstacles are detected, then a process similar to the one discussed above with respect to FIG. 4 is performed. As can be readily appreciated, depending on the hardware limitations and application to be performed, any number of different methods can be used to map loudspeaker positions without departing from the scope or spirit of the invention.

Estimating Loudspeaker Rotations

In many embodiments, loudspeakers as discussed herein are capable of emanating sound at least across a plane in all directions, simultaneously. In various embodiments, the loudspeakers have a circular horn array with equally spaced horns enabling such functionality. In various embodiments, a single horn pointed orthogonally to the plane can be used. In numerous embodiments, microphones are placed across the loudspeaker in such a way that the incoming direction of sound can be determined. As such, not only may the particular placement of the loudspeaker matter, but also the rotation. That is, it is desirable to know the direction that each horn on the loudspeaker is facing in order to synchronize playback across loudspeakers in the audio system. This can be particularly important in spatial audio systems.

Figure 7:
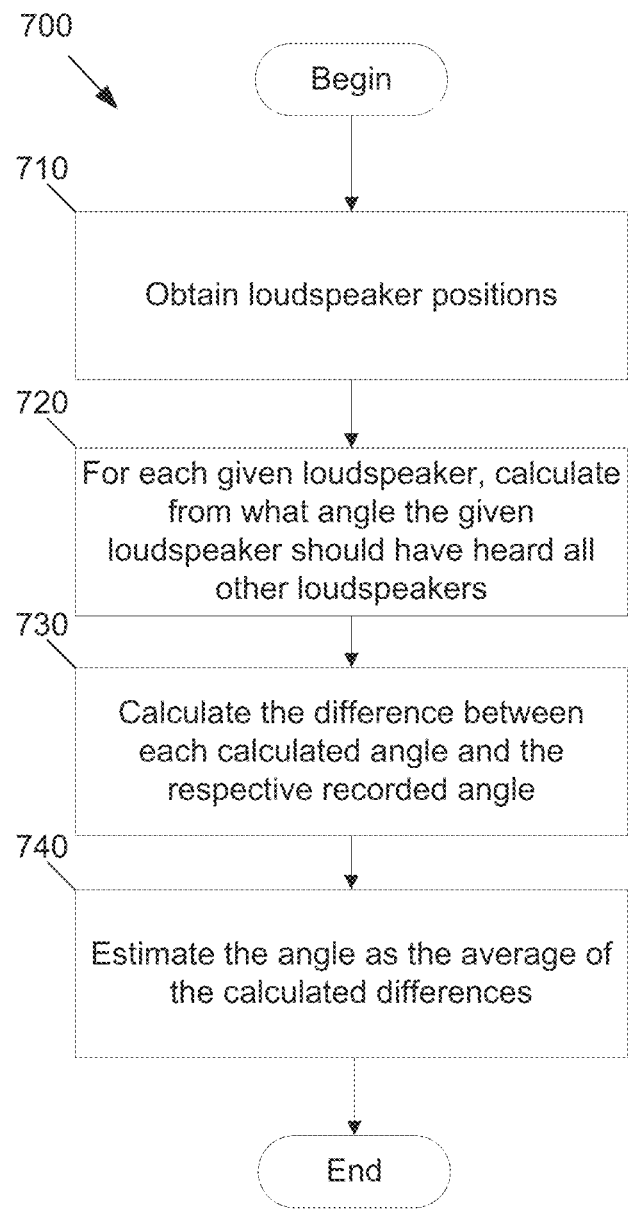
FIG. 7 is a flow chart for a layout mapping process for determining orientation of loudspeakers in accordance with an embodiment of the invention.

Self-mapping audio systems can determine the rotation (also referred to as orientation) of loudspeakers in the system. FIG. 7 illustrates a process for determining loudspeaker rotations in accordance with an embodiment of the invention. Process 700 includes obtaining (710) loudspeaker positions. For each given loudspeaker in the system, the angle from which the given loudspeaker should have heard all other loudspeakers is calculated (720). The difference between each calculated angle and the respective recorded angle in the AOA matrix is then calculated (730). The average of the calculated differences is selected as the estimated (740) angle of rotation for the given loudspeaker. In numerous embodiments, the median of the calculated differences is selected. This process can be performed for each loudspeaker in the system in order to calculate all rotations.

Using the above techniques, both the location and orientation of all loudspeakers capable of producing data for distance and AOA matrices. From this information, audio playback can be modified to enhance listenability and user experience. This information can be particularly useful for rendering spatial audio and/or surround sound. For example, a usable listening area can be calculated based on known line-of-sight obstacles, a process for which is discussed below.

Calculating Usable Listening Area

Figure 8:
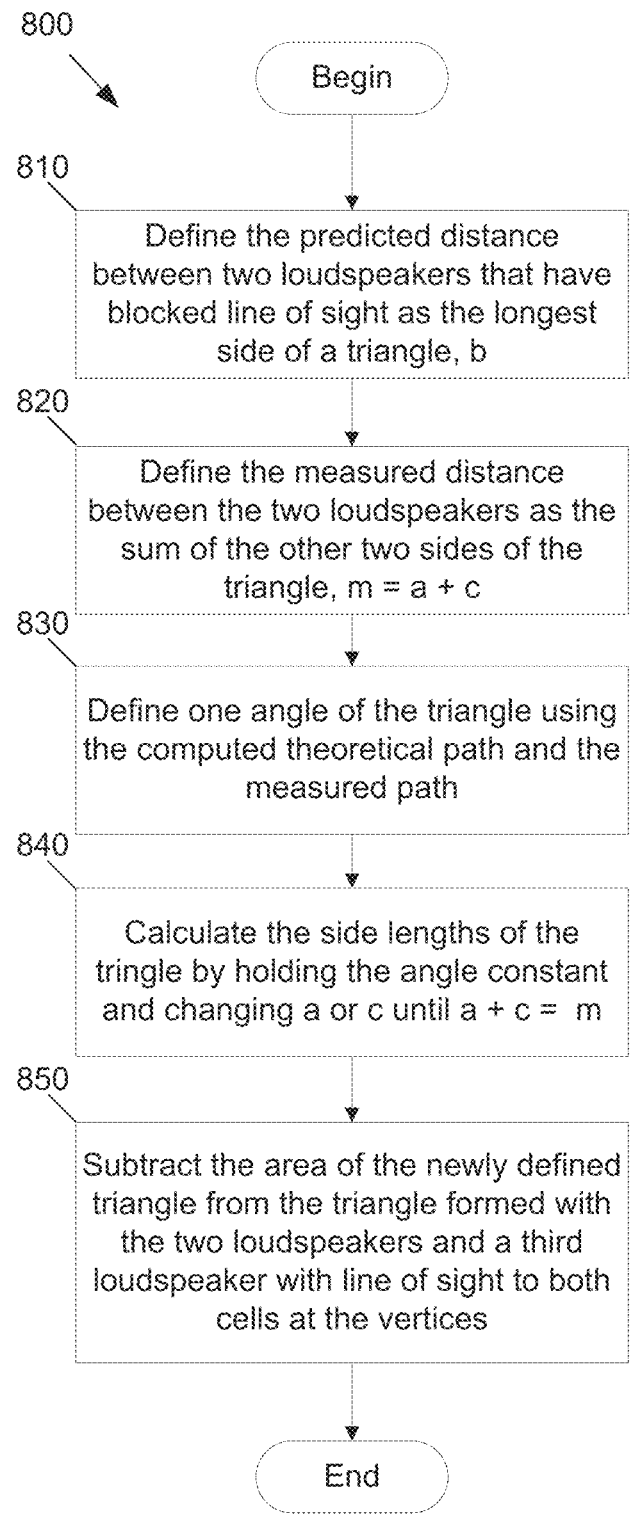
FIG. 8 is a flow chart for a layout mapping process for calculating usable listening area in accordance with an embodiment of the invention.
Figure 9:
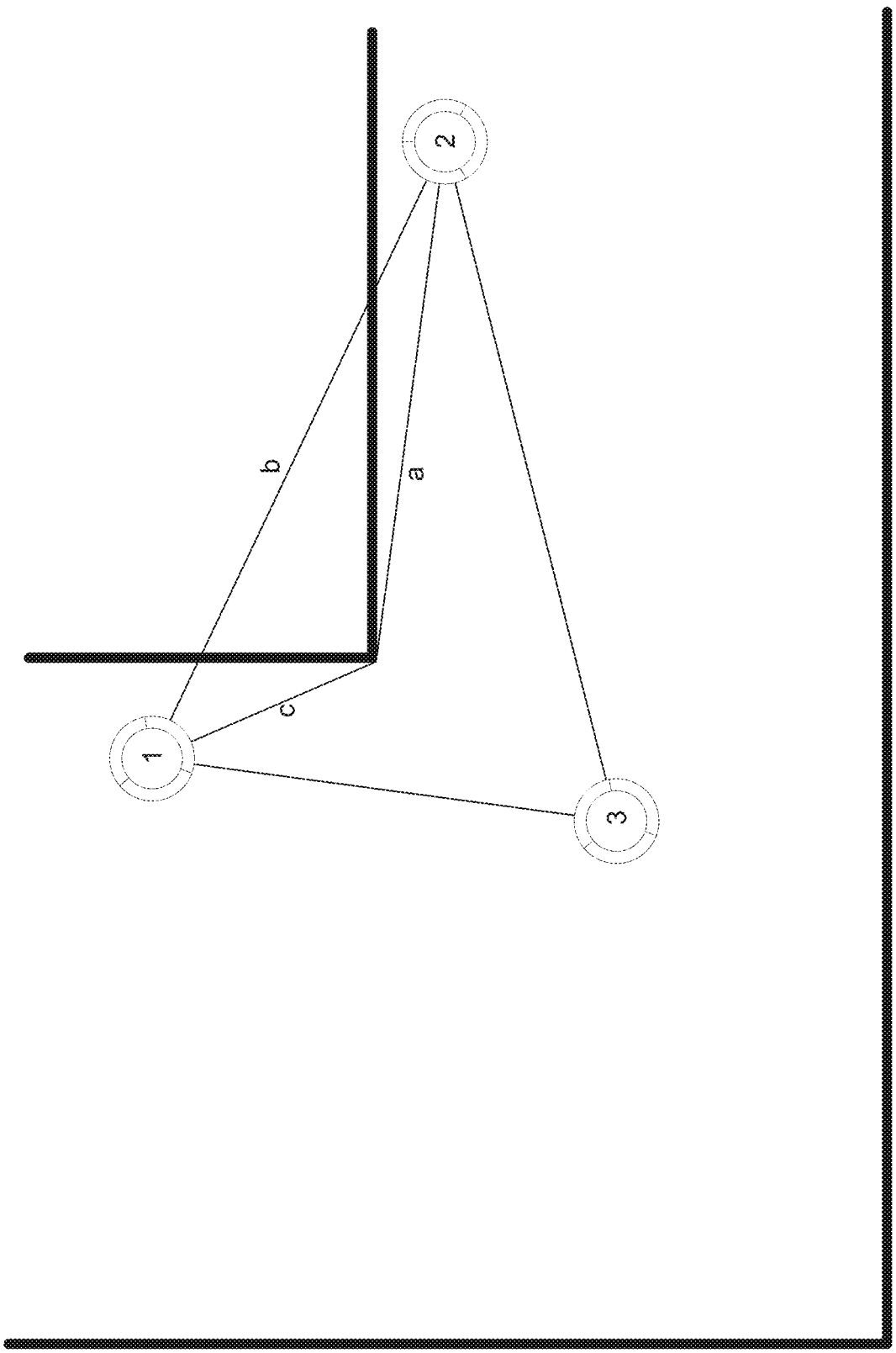
FIG. 9 illustrates an example usable listening area in accordance with an embodiment of the invention.

"Usable" listening area does not describe the only area where sound can be played back, but rather a more optimal listening area for greater user experience. Depending on the usable listening area, different audio rendering modes may be more optimal for the particular layout. Turning now to FIG. 8, a process for calculating usable listening area in accordance with an embodiment of the invention is illustrated. FIG. 8 can be understood in view of FIG. 9 which graphically represents an example scenario with respect to the process.

Figure 10:
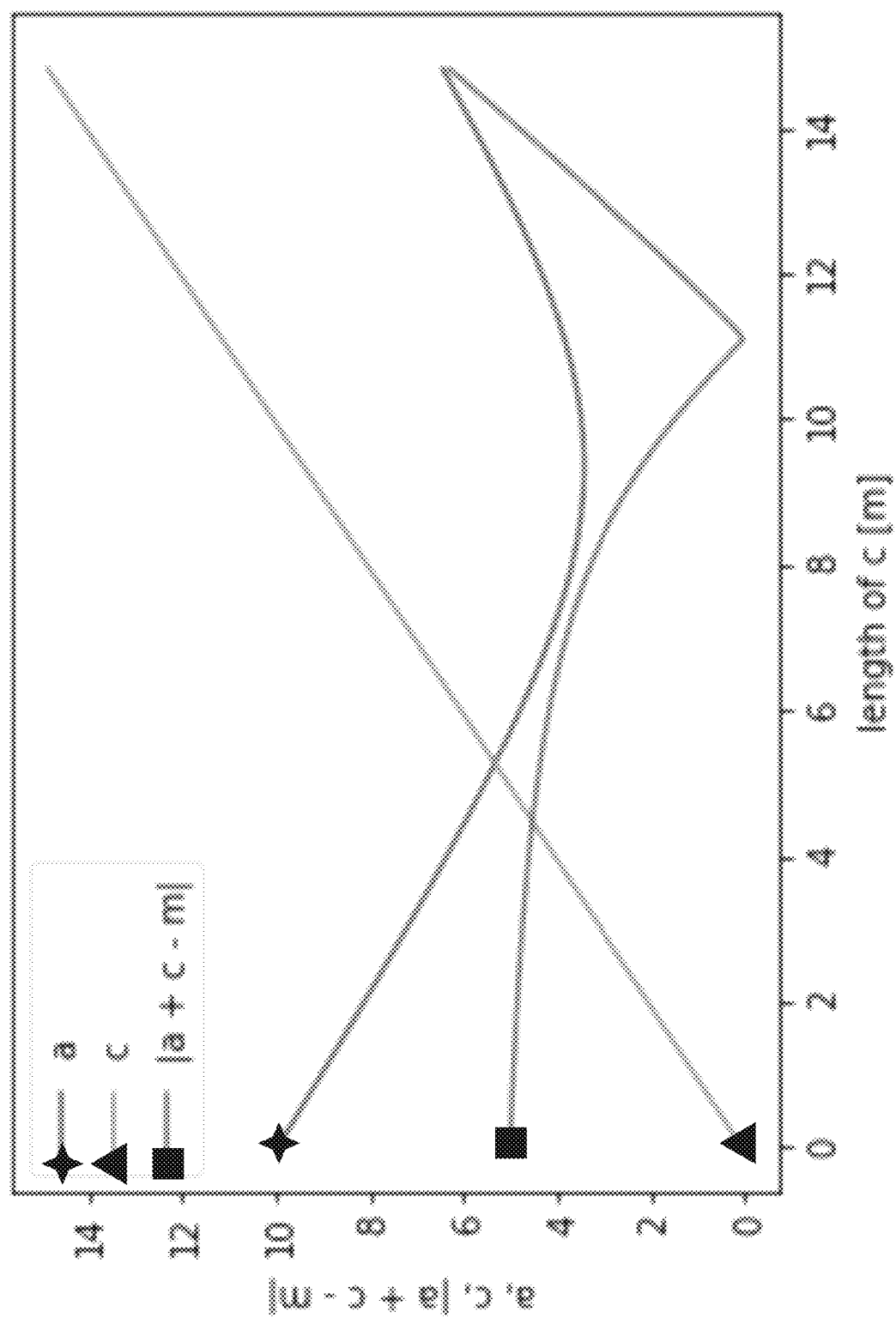
FIG. 10 is a chart illustrating the calculation of a usable listening area in accordance with an embodiment of the invention.

Process 800 includes defining (810) the predicted distance between two loudspeakers not having line-of-sight as the longest side of a triangle, b. In many embodiments, the predicted distance is the distance that would be predicted as the distance between the two loudspeakers from the perspective of a third loudspeaker. However, the predicted distance can be calculated as the line-of-sight distance between the two loudspeakers in any way as appropriate to the requirements of specific applications of embodiments of the invention. Then, define (820) the measured distance between the two loudspeakers as the sum of the other two sides of the triangle, m=a+c. Using the angle between the vector describing the computed theoretical distance between the two loudspeakers, and a vector pointing to the obstacle from one of the two loudspeakers, define (830) the angle as an angle of the according side of the triangle. The vector pointing to the obstacle can be obtained using the angle at which the other loudspeaker was heard, which points to the point at which the sound wrapped around the obstacle. The correct lengths for the remaining sides of the triangle (a and c) can then be calculated (840) by holding the defined angle constant and changing one side length from 0.1*m until 1*m. The point where a+c=m matches the equivalent area. A graphical representation of this calculation for an example scenario in accordance with an embodiment of the invention is illustrated in FIG. 10. Once the triangle is defined, it can be subtracted (850) from the triangle formed with the two loudspeakers and a third loudspeaker with line of sight to the other two at its vertices. The remaining area is a usable estimate of the listening area which in turn can be used to guide playback and/or recommend a different layout to the user. While a particular process for determining usable listening area in accordance with an embodiment of the invention is illustrated in FIG. 8, any number of different processes can be used, including (but not limited to) those that utilize more than three loudspeakers, as appropriate to the requirements of specific applications of embodiments of the invention.

While line-of-sight obstacles are important for determining placement and audio rendering, knowing the location of obstacles that do not impact line-of-sight is also valuable. For example, walls can be used to bounce certain audio frequencies, change the direction that audio is rendered, and/or informing many other useful audio playback methods as appropriate to the requirements of specific applications of embodiments of the invention. Processes for detecting nearby obstacles such as (but not limited to) walls are discussed below.

Close Object Detection

Figure 11:
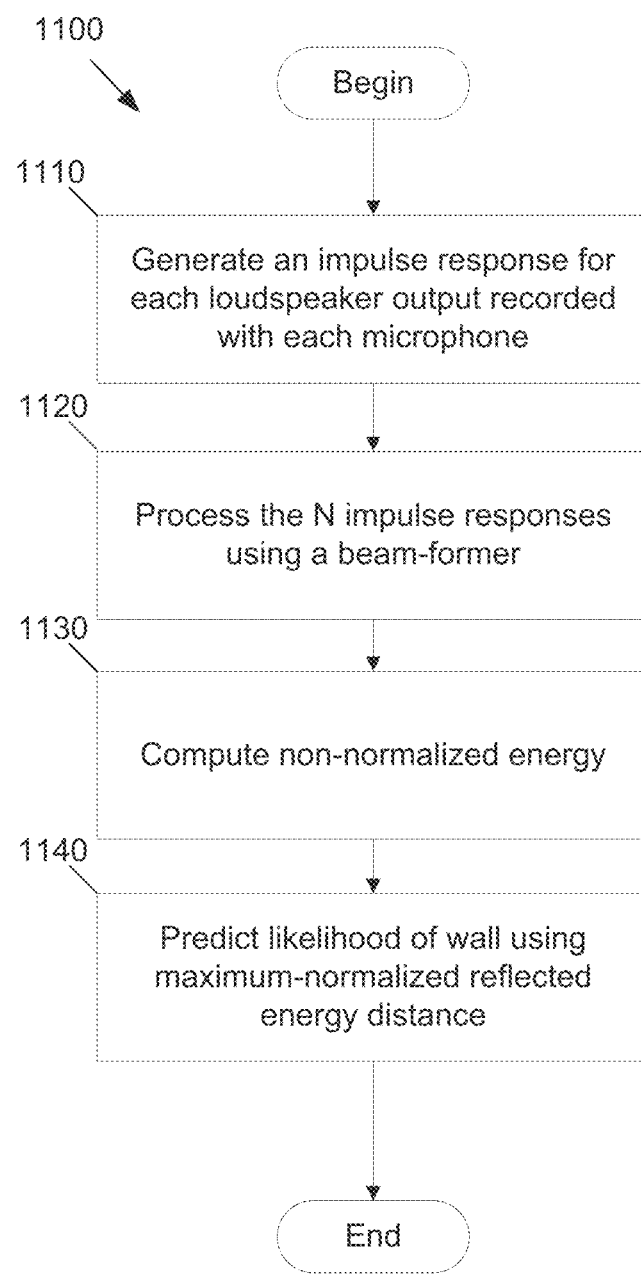
FIG. 11 is a flow chart for a layout mapping process for determining the presence of walls in accordance with an embodiment of the invention.

Walls are common obstacles in offices, homes, and essentially all structures. Depending on their composition and placement, they can greatly impact how sound is played back. Similarly, other objects placed in proximity to loudspeakers can impact how sound propagates. Turning now to FIG. 11, a process for detecting nearby obstacles in accordance with an embodiment of the invention is illustrated. While the discussion of FIG. 8 below is made with reference to walls as the obstacles, any nearby obstacle can be detected using similar methods without departing form the scope or spirit of the invention.

Process 1100 includes generating (1110) an impulse response for each loudspeaker output recorded with each microphone. For example, if a loudspeaker has three, coplanar horns equally spaced on a ring, and three microphones each positioned under a respective horn, three outputs can be produced and separately recorded by each microphone to generate nine impulse responses. By way of further example, in numerous embodiments the same loudspeaker configuration simultaneously playback the output from all three horns simultaneously which in turn can be recorded by the three microphones simultaneously to generate three impulse responses to generate an approximately functionally equivalent dataset while simultaneously taking less time overall. As can be readily appreciated, the number of horns and microphones is not required to be three, and any number of horns and microphones can be used to generate N impulse responses as long as directionality can be determined without departing from the scope or spirit of the invention.

The generated N impulse responses are processed (1120) using a beam-former. In doing so, the beam can be steered into any desired direction. In various embodiments, the output of the beam-former can be used to generate additional estimated impulse responses for the desired steering directions. In various embodiments, the length of the impulse response is limited to "look" only at a certain distance (e.g. 1-2 meters). In this way, only obstacles likely to have a significant impact are detected and processing power can be conserved. However, distance does not have to be limited, and any range can be searched as appropriate to the requirements of specific applications of embodiments of the invention.

The sum of squares of the generated impose responses is computed to calculate the non-normalized energy as a measure of reflected energy over a 360-degree spin. In numerous embodiments, this is formalized as:

$$p(\theta) = \Sigma_{i=0}^{N-1} r_i(\theta)^2$$

Where $\theta$ is the steering direction, $r_i$ is the ith impulse response, and i is the sample index.

The likelihood of a wall (or other obstacle) being present can then be calculated (1140) using the measure of reflected energy. In numerous embodiments, wall is most likely to be found where the highest energy is found. Said angle can be found mathematically as follows:

$$\theta_{wall} = \theta(\mathrm{argmax}\ p(\Gamma))$$

In many embodiments, calculating the likelihood is achieved by looking at the maximum normalized reflected energy distance. Since the distance itself varies significantly with the room, wall surfaces, distances to the walls, etc., the likelihood can be thought of as a Bayesian classification problem. The likelihood can be computed by squashing and scaling the energy function through a sigmoid function, formalized as:

$$\mathcal{L}(w) = \frac{1}{1 + \exp\left(-\left(\alpha \frac{\max(\mathrm{power}) - \min(\mathrm{power})}{\max(\mathrm{power})} - \beta\right)\right)}$$

where $\alpha$ and $\beta$ can be determined using training data and a machine learning model. In various embodiments, the prior probability p(w) can be estimated from example data. In a number of embodiments, p(w) is approximately 0.8, however this is highly variable depending on the application, and is not a requirement. The binary decision if a wall is present or not can then be computed as:

$$\mathrm{closeToWall} = \mathrm{bool}[\mathcal{L}(w)p(w) > (1 - \mathcal{L}(w))(1 - p(w))]$$

This can be performed across any number of different loudspeakers in order to generate a mapping of nearby obstacles such as (but not limited to) walls. This information can be used in the rendering of spatial audio, the determination of playback modes, and/or any other determination as appropriate to the requirements of specific applications of embodiments of the invention.

Although specific systems and methods for loudspeaker layout mapping are discussed above, many different methods can be implemented in accordance with many different embodiments of the invention. For example, systems and methods described herein can be augmented using radio frequency communications to augment localization, e.g. by using ultra-wideband. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A loudspeaker capable of determining its location relative to other loudspeakers, comprising:
 a plurality of microphones;
 a plurality of drivers;
 a processing circuitry; and
 a memory, the memory containing a layout mapping application which directs the processing circuitry to:
  receive a stimulus tone from each other loudspeaker in a plurality of loudspeakers using the plurality of microphones;
  determine an angle at which each stimulus tone was received;
  generate an impulse response for each received stimulus tone using each said received stimulus tone, each generated impulse response associated with the other loudspeaker from the plurality of loudspeakers which generated the received stimulus tone;
  transmit the stimulus tone using the plurality of drivers;
  receive, from each other loudspeaker in the plurality of other loudspeakers, a plurality of impulse responses, and a plurality of angles from stimulus tones were received by the other loudspeaker;
  generate a distance matrix using the generated impulse responses and the received pluralities of impulse responses;
  generate an angle of arrival (AOA) matrix using the determined angles and the received pluralities of angles; and
  determine a location for each other loudspeaker in the plurality of other loudspeakers in a coordinate system.

2. The loudspeaker of claim 1, wherein each value in the distance matrix is an estimated distance between two loudspeakers based on time-of-flight calculations using impulse responses associated with stimulus tones produced by a first of the two loudspeakers received by a second of the two loudspeakers, and impulse responses produced by the second of the two loudspeakers received by the first of the two loudspeakers.

3. The loudspeaker of claim 1, wherein each value in the AOA matrix is the angle from which a respective stimulus tone produced by a first loudspeaker was recorded by a second loudspeaker from a perceived orientation of the second loudspeaker.

4. The loudspeaker of claim 1, wherein to determine the location of each other loudspeaker in the plurality of other loudspeakers, the layout mapping application further directs the processing circuitry to:
 define the coordinate system using the loudspeaker and a second loudspeaker from the plurality of other loudspeakers, where the loudspeaker is at an origin of the coordinate system, and the second loudspeaker is placed at a distance and angle from the origin based on the distance matrix and the AOA matrix; and
 place the remainder of the other loudspeakers in the plurality of loudspeakers in the coordinate system based on the measured distance and angle from the loudspeaker based on the distance matrix and the AOA matrix, adjusted to match the defined coordinate system.

5. The loudspeaker of claim 4, wherein the layout mapping application further directs the processing circuitry to incrementally adjust the position of each loudspeaker in the coordinate system until average error between distance values in the distance matrix and distances between loudspeakers in the coordinate system is minimized.

6. The loudspeaker of claim 4, wherein the layout mapping application further directs the processor to identify a lack of line-of-sight between at least two loudspeakers in the coordinate system; and
 adjust the location of each given loudspeaker of the two loudspeakers using distance measurements in the distance matrix and angle measurements in the AOA matrix based on measurements from loudspeakers with line-of-sight to the given loudspeaker.

7. The loudspeaker of claim 1, wherein the layout mapping application further directs the processor to determine an orientation for each other loudspeaker in the plurality of other loudspeakers.

8. The loudspeaker of claim 7, wherein to determine the orientation for each other loudspeaker in the plurality of other loudspeakers, the layout mapping application further directs the processing circuitry to:
 calculate, for each given other loudspeaker in the plurality of other loudspeakers, an angle at which the given other loudspeaker should have heard each of the remainder of other loudspeakers and the loudspeaker, in the frame of reference of the loudspeaker, based on the determined locations;
 calculate the difference between the calculated angles and associated angles in the AOA matrix;
 assigning the rotation for each other loudspeaker in the plurality of other loudspeakers as the calculated difference.

9. The loudspeaker of claim 1, wherein the layout mapping application further directs the processing circuitry to determine a usable listening area based on the placements and orientations of the other loudspeakers in the plurality of other loudspeakers.

10. The loudspeaker of claim 9, wherein to determine a usable listening area, the layout mapping application further directs the processing circuitry to:
 identify an obstacle blocking line of sight between two loudspeakers, and a third loudspeaker having line of sight to both of the two loudspeakers;
 calculate the linear distance between the two loudspeakers, b, as a longest side of a triangle;
 define a measured distance, m, from the distance matrix, as the sum of a first and a second side of the triangle: a and c, respectively;
 define angles of the triangle using vectors describing a computed theoretical path between the two loudspeakers and the third loudspeaker, and a vector pointing from each of the two loudspeakers to an edge of the obstacle;
 calculate the values of a and c by modifying the values of a and c until a+c=m, while maintaining the triangle as valid; and
 define the usable listening area as comprising the shape having sides a, c, the line segment formed between a first of the two loudspeakers and the third loudspeaker, and the line segment formed between a second of the two loudspeakers and the third loudspeaker.

11. A method for automatically determining the relative positions of loudspeakers in an audio system, comprising:
 for each given loudspeaker in a plurality of loudspeakers:
  generating a stimulus tone using the given loudspeaker;
  recording the stimulus tone at all loudspeakers in the plurality of loudspeakers but the given loudspeaker; and
  recording the angle from which the stimulus tone was received by all loudspeakers in the plurality of loudspeakers but the given loudspeaker;

generating an impulse response for each recorded stimulus tone;
generating a distance matrix and an angle of arrival (AOA) matrix based on the impulse responses, where each value in the distance matrix is an estimated distance between two loudspeakers in the plurality of loudspeakers based on time-of-flight calculations using the impulse responses, and where each value in the AOA matrix is the angle from which a respective stimulus tone was recorded;
defining a coordinate having a first loudspeaker from the plurality of loudspeakers at the origin, and a second loudspeaker from the plurality of loudspeakers on a first axis of the coordinate at an estimated distance between the first loudspeaker and the second loudspeaker from the distance matrix; and
placing remaining loudspeakers from the plurality of loudspeakers in the coordinate at distances and angles from already placed loudspeakers in the coordinate using values from the distance matrix and AOA matrix.

12. The method of claim 11, further comprising:
identifying the presence of an obstacle based on inconsistent distances in the distance matrix; and
correcting the distances in the distance matrix using measurements from at least three loudspeakers.

13. The method of claim 11, further comprising assigning an orientation to each loudspeaker in the coordinate system.

14. The method of claim 13, wherein assigning an orientation to each loudspeaker in the coordinate system comprises:
calculating an angle at which each loudspeaker should have heard each of the remainder of loudspeakers based on the determined locations;
calculating the difference between the calculated angles and associated angles in the AOA matrix; and
assigning the rotation for each loudspeaker as the calculated difference.

15. The method of claim 11, further comprising determining a usable listening area based on the placements and orientations of the loudspeakers.

16. The method of claim 15, wherein determining a usable listening area comprises:
identifying an obstacle blocking line of sight between two loudspeakers, and a third loudspeaker having line of sight to both of the two loudspeakers;
calculating the linear distance between the two loudspeakers, b, as a longest side of a triangle;
defining a measured distance, m, from the distance matrix, as the sum of a first and a second side of the triangle: a and c, respectively;
defining angles of the triangle using vectors describing a computed theoretical path between the two loudspeakers and the third loudspeaker, and a vector pointing from each of the two loudspeakers to an edge of the obstacle;
calculating the values of a and c by modifying the values of a and c until a+c=m, while maintaining the triangle as valid; and
defining the usable listening area as comprising the shape having sides a, c, the line segment formed between a first of the two loudspeakers and the third loudspeaker, and the line segment formed between a second of the two loudspeakers and the third loudspeaker.

17. A self-mapping audio system, comprising:
a plurality of loudspeakers;
a processor, communicatively coupled to the plurality of loudspeakers; and
a memory communicatively coupled to the processor, the memory containing a layout mapping application that directs the processor to:
sequentially generate a stimulus tone using each given loudspeaker in the plurality of loudspeakers;
record the stimulus tone at all loudspeakers in the plurality of loudspeakers but the given loudspeaker; and
record the angle from which the stimulus tone was received by all loudspeakers in the plurality of loudspeakers but the given loudspeaker;
generate an impulse response for each recorded stimulus tone;
generate a distance matrix and an angle of arrival (AOA) matrix based on the impulse responses, where each value in the distance matrix is an estimated distance between two loudspeakers in the plurality of loudspeakers based on time-of-flight calculations using the impulse responses, and where each value in the AOA matrix is the angle from which a respective stimulus tone was recorded;
define a coordinate having a first loudspeaker from the plurality of loudspeakers at the origin, and a second loudspeaker from the plurality of loudspeakers on a first axis of the coordinate at an estimated distance between the first loudspeaker and the second loudspeaker from the distance matrix; and
place remaining loudspeakers from the plurality of loudspeakers in the coordinate at distances and angles from already placed loudspeakers in the coordinate using values from the distance matrix and AOA matrix.

18. The system of claim 17, wherein the layout mapping application further directs the processor to:
identify the presence of an obstacle based on inconsistent distances in the distance matrix; and
correct the distances in the distance matrix using measurements from at least three loudspeakers.

19. The system of claim 17, wherein the layout mapping application further directs the processor to assign an orientation to each loudspeaker in the coordinate system.

20. The system of claim 19, to assign orientation to each loudspeaker in the coordinate system, the layout mapping application further directs the processor to:
calculate an angle at which each loudspeaker should have heard each of the remainder of loudspeakers based on the determined locations;
calculate the difference between the calculated angles and associated angles in the AOA matrix; and
assign the rotation for each loudspeaker as the calculated difference.

21. The system of claim 17, wherein the layout mapping application further directs the processor to determine a usable listening area based on the placements and orientations of the loudspeakers.

22. The system of claim 21, wherein to determine a usable listening area, the layout mapping application further directs the processor to:
identify an obstacle blocking line of sight between two loudspeakers, and a third loudspeaker having line of sight to both of the two loudspeakers;
calculate the linear distance between the two loudspeakers, b, as a longest side of a triangle;
define a measured distance, m, from the distance matrix, as the sum of a first and a second side of the triangle: a and c, respectively;

define angles of the triangle using vectors describing a computed theoretical path between the two loudspeakers and the third loudspeaker, and a vector pointing from each of the two loudspeakers to an edge of the obstacle;

calculate the values of a and c by modifying the values of a and c until a+c=m, while maintaining the triangle as valid; and define the usable listening area as comprising the shape having sides a, c, the line segment formed between a first of the two loudspeakers and the third loudspeaker, and the line segment formed between a second of the two loudspeakers and the third loudspeaker.

23. The system of claim 17, wherein the processor and the memory are incorporated into one of the loudspeakers in the plurality of loudspeakers.

* * * * *